SAMPSON & BILLINGS.
Attaching Hubs to Axles.

No. 6,887. Patented Nov 20, 1849

UNITED STATES PATENT OFFICE.

ELNATHAN SAMPSON AND A. M. BILLINGS, OF CLAREMONT, NEW HAMPSHIRE.

CONNECTING HUBS WITH AXLES.

Specification of Letters Patent No. 6,887, dated November 20, 1849.

*To all whom it may concern:*

Be it known that we, ELNATHAN SAMPSON and A. M. BILLINGS, of Claremont, in the county of Sullivan and State of New Hampshire, have invented a new and Improved Manner of Attaching Wheel-Hubs to Axletrees; and we do hereby declare the following to be a full and exact description thereof, reference being had to the accompanying drawings, making a part of this specification, in which—

Figure 1:
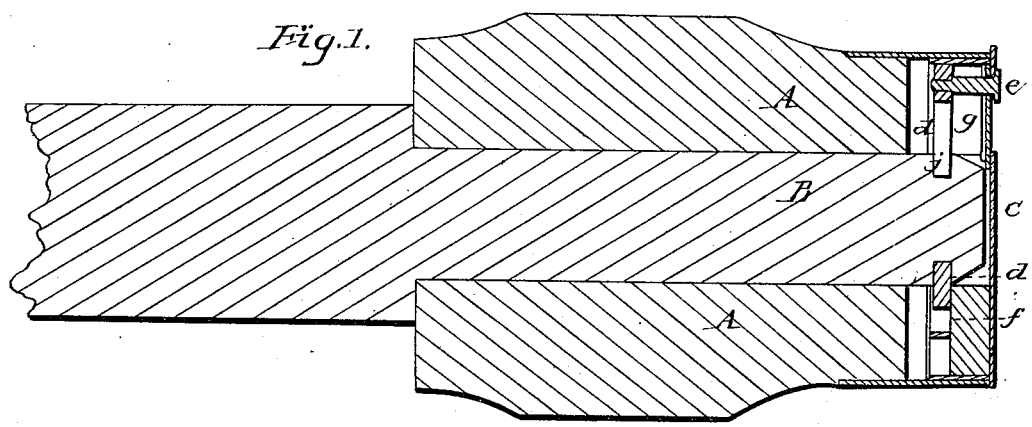
Figure 2:
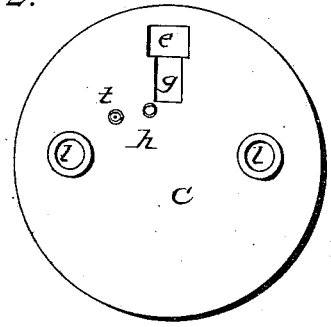
Figure 3:
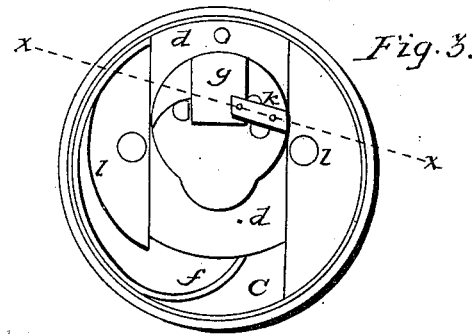

Figure 1, is a longitudinal section cut through the center of a hub and the end of an axletree; Fig. 2, a plan of the front side of the cap (C,) that is secured to the end of the hub, (A,); Fig. 3, a plan of the inner side of the cap, (C,), and Fig. 4, a section through the line $x$, $x$, of Fig. 3.

Similar letters indicate like parts in all the figures.

Figure 4:
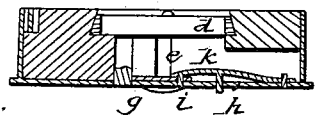

We secure the hub A, to one of the journals B, of the axle in the following manner within the cap C, which is made fast to the outer end of the hub A, we place in suitable guiding grooves, the perforated plate $d$, one end of which plate is acted upon by the spring $f$; an operating knob shank $e$, passes through a slot in the head of the cap C, and through a sliding plate $g$, fitted to its inner side, and thence passes into and is secured in one end of the perforated plate $d$ as shown in Fig. 1; by means of which knob shank, the plate $d$, can be moved longitudinally in its bearings against the spring $f$. The perforated plate $d$, is caught and retained in its position—when it is forced to the end of its guiding grooves by the spring $f$—by the pin $i$, on the spring $k$, which is forced through a hole in the plate $g$, into a hole in the head of C as shown in Figs. 3 and 4; the catch pin $i$, is detached from its hold upon the plate $g$, by pressing against the pin $h$, which projects from the spring $k$, through a hole in the head of the cap C. Near the outer extremity of each of the journals B, of the axle, an annular groove $j$, is formed, from which groove each journal is tapered to its extremity. When a journal is inserted within a hub, its tapering end as it enters the opening in the plate $d$, will force the plate against the action of the spring $f$, until the journal has fully reached its proper position within the hub, when the side of the aperture in $d$, nearest to the spring $f$, will be forced into the groove $j$, in the journal, and the catch pin $i$, will be driven to its place by the spring $k$; by which means the journal will be so securely fastened within the hub that no jolting of the wheel can detach it from its position. The plate $g$, serves to perfectly close the slot in the head of the cap C, that receives the shank $e$, against the admission of dust. When the wheels strike violently against an obstruction, so much motion might thereby be imparted to the spring $f$, and plate $d$, as to detach the wheel from the axle, did not the catch pin $i$, serve to guard against and prevent such an occurrence.

By our improved manner of fastening the hub and axle to each other, no greater length of hub is required than is usual where other modes of factening is employed; and the bearing surfaces are as perfectly guarded against the admission of dust as they possibly can be by any other mode of fastening a hub to its axle.

We do not claim confining hubs to axles by a spring catch on the one working in a groove in the other,—this having already been done—but What we do claim as our inventen and desire to secure by Letterfs Patent, is—

The fastening a wheel hub to its axle by means of an annular groove ($j$) near the extremity of the axle journal, (B,), and a sliding retaining plate $d$, and a spring guard pin $i$, placed within the cap (C) made fast to the outer end of the hub; (A;) to wit; a curved portion of the said retaining plate $d$, being forced by the spring $f$, into the groove $j$, in the axle journal, and securely retained when in that position by the spring guard pin $i$, substantially in the manner herein set forth.

The above specification signed and witnessed this twenty-seventh day of September 1849.

ELNATHAN SAMPSON.
A. M. BILLINGS.

Witnesses:
J. D. BILLINGS,
C. K. BILLINGS.